(12) United States Patent  (10) Patent No.: US 8,179,542 B2
Yagi  (45) Date of Patent: May 15, 2012

(54) INFORMATION PROCESSING DEVICE, IMAGE FORMING APPARATUS, AND PROCESS CONTROL SYSTEM

(75) Inventor: Atsuko Yagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1168 days.

(21) Appl. No.: 11/855,027

(22) Filed: Sep. 13, 2007

(65) Prior Publication Data

US 2008/0068638 A1   Mar. 20, 2008

(30) Foreign Application Priority Data

Sep. 15, 2006 (JP) ................................. 2006-251185
Aug. 17, 2007 (JP) ................................. 2007-212856

(51) Int. Cl.
*G06F 3/12* (2006.01)
*G06K 15/00* (2006.01)

(52) U.S. Cl. ...................... 358/1.14; 358/1.13; 358/1.15

(58) Field of Classification Search ................. 358/1.14, 358/1.13, 1.15, 400; 718/107
See application file for complete search history.

(56) References Cited

U.S. PATENT DOCUMENTS

| | | | |
|---|---|---|---|
| 7,567,360 B2 * | 7/2009 | Takahashi et al. | 358/1.15 |
| 2004/0057065 A1 * | 3/2004 | Michimura et al. | 358/1.13 |
| 2008/0052724 A1 * | 2/2008 | Numata | 718/107 |

FOREIGN PATENT DOCUMENTS

| | | |
|---|---|---|
| JP | 07-78181 A | 3/1995 |
| JP | 2003-32425 | 1/2003 |
| JP | 2003-177881 | 6/2003 |
| JP | 2004-171199 | 6/2004 |
| JP | 2005-208934 | 8/2005 |
| JP | 2005-254527 | 9/2005 |
| JP | 2006-185208 | 7/2006 |
| JP | 2006-203283 A | 8/2006 |

* cited by examiner

*Primary Examiner* — Charlotte M Baker
*Assistant Examiner* — Rury Grisham
(74) *Attorney, Agent, or Firm* — Dickstein Shapiro LLP

(57) ABSTRACT

An information processing device includes a communication unit that sends entry-sheet-definition data to an image forming apparatus such that a collation-information entry sheet for entering collation information is displayed on the image forming apparatus. After the image forming process is complete, the communication unit receives from the image forming apparatus image data and collation information corresponding to the image data. A processing unit associates received collation information with flow-definition data and executes one or more flows of processes defined in the flow-definition data with respect to the image data.

14 Claims, 18 Drawing Sheets

FIG. 4

FLOW-DEFINITION DATA

```xml
<?xml version=" 1.0" ?>
<Distribution>
    //DEFINE A FLOW-ID FOR A FLOW AND COLLATION INFORMATION USED
    IN THE FLOW
    <ID>ContractDocumentFlow</ID>
    <LinkedPropertyScreen>CollationInformationOfContractDocument</LinkedPropertyScreen>
    //DEFINE AN IMAGE CONVERSION PROCESS OF IMAGE DATA
    <Plugin>
        <PluginID>ImageConverter</PluginID>
        <PluginType>Filter</PluginType>
        <Parameters>
            <FileFormat>PDF</FileFormat>
        </Parameters>
        <Next>
            //DEFINE A PROCESS OF DELIVERING THE IMAGE DATA TO A
            FOLDER AFTER THE IMAGE CONVERSION PROCESS
            <Plugin>
                <PluginID>ToFolder</PluginID>
                <PluginType>Output</PluginType>
                <Parameters>
                    <FileName>ContractDocument{num}_{text1}</FileName>  ←——— 401
                    <Destinations>
                        <Path>\\111.111.111.111\Folder_1</Path>
                        <Path>\\111.111.111.111\Folder_2</Path>
                    </Destinations>
                </Parameters>
            </Plugin>
        </Next>
    </Plugin>
    //DEFINE A PROCESS OF EMAILING THE IMAGE DATA EXECUTED IN
    PARALLEL WITH THE PROCESSES DESCRIBED ABOVE
    <Plugin>
        <PluginID>ToEmail</PluginID>
        <PluginType>Output</PluginType>
        <Parameters>
            <SmtpServer>111.111.111.111</SmtpServer>
            <Sender>abc@xxx.yyy.com</Sender>
            <Subject>ContractDocument{num}</Subject>   ←——— 402
            <Body>Contractee:{text1}</Body>   ←——— 403
            <FileName>ContractDocument{num}_{text1}</FileName>  ←——— 404
            <Destinations>
                <Address>dest1@xxx.yyy.com</Address>
                <Address>dest2@xxx.yyy.com</Address>
            </Destinations>
        </Parameters>
    </Plugin>
</Distribution>
```

FIG. 5

ENTRY-SHEET DEFINITION DATA

```
<?xml version=" 1.0" ?>
<Screen>
    //DEFINE AN ID FOR ENTRY-SHEET DEFINITION DATA
    <ID>CollationInformationOfContractDocument</ID>
    //ENTRY-ITEMS IN COLLATION INFORMATION
    <Items>
        //CHARACTER STRING TYPE
        <text1 Type=" String" Is Enabled=" true" IsRequired=" false"
              DisplayName=" CONTRACTEE" MaxLength=" 20" IsPassword= "false"
              ValidationString="" />
        //NUMERICAL TYPE
        <numType=" Numeric" IsEnabled=" true" IsRequired=" false"
              DisplayName=" CONTRACT NUMBER" MaxValue=" 100" MinValue=" 20" />
    </Items>
</Screen>
```

| EMAIL SETTINGS |
|---|
| EMAIL SYSTEM SETTINGS |
| EMAIL OPTION SETTINGS |
|     DEFAULT DESTINATION [             ] |
|     TYPE OF ATTACHED DOCUMENT [ all ] |
|     NAME OF ATTACHED DOCUMENT [ ContractDocument{num} ] |
|     URL ATTACHMENT  ○ ON   ● OFF |
|     BODY TEXT [ Contractee:{text1} ] |
|     SEND COPY OF EMAIL TO SENDER  ○ ON   ● OFF |
|     DEFAULT EMAIL DOMAIN [            ] |
|     ERROR NOTIFICATION  ● NOTIFY ERROR TO SENDER |
| EMAIL SEARCH SETTINGS |

FIG. 9

| CHARACTER ATTRIBUTE | |
|---|---|
| GENERAL SETTINGS | |
| ALLOW EDITING | ○ FALSE  ● TRUE |
| ENTRY MANDATORY IN EACH FIELD | ○ TRUE  ● FALSE |
| DISPLAY NAME | Contractee |
| TAG NAME | text1 |
| CHARACTER-ATTRIBUTE SETTINGS | |
| MAXIMUM LENGTH | 20 |
| PASSWORD | ○ TRUE  ● FALSE |
| VALIDATION STRING | |

[ OK ]  [ CANCEL ]

FIG. 10

| NUMERICAL ATTRIBUTE | |
|---|---|
| GENERAL SETTINGS | |

| | | |
|---|---|---|
| ALLOW EDITING | ○ FALSE | ● TRUE |
| ENTRY MANDATORY IN EACH FIELD | ○ TRUE | ● FALSE |
| DISPLAY NAME | CONTRACT NUMBER | |
| TAG NAME | num | |

NUMERICAL-ATTRIBUTE SETTINGS

| | |
|---|---|
| MAXIMUM VALUE | 100 |
| MINIMUM VALUE | 20 |

[ OK ]  [ CANCEL ]

| COLLATION INFORMATION OF CONTRACT DOCUMENT | |
|---|---|
| CONTRACTEE | |
| CONTRACT-DOCUMENT NUMBER | |

| COLLATION INFORMATION OF CONTRACT DOCUMENT | |
|---|---|
| CONTRACTEE | XYZ |
| CONTRACT-DOCUMENT NUMBER | 30 |

```
<Screen>
    <ID>CollationInformationOfContractDocument</ID>
    <Items>
        <text1>XYZ</text1>
        <num>30</num>
    </Items>
</Screen>
```

FIG. 16

FLOW-DEFINITION DATA

```
<?xml version=" 1.0" ?>
<Distribution>
    //DEFINE A FLOW-ID FOR A FLOW AND COLLATION INFORMATION USED
    IN THE FLOW
    <ID>ContractDocumentFlow</ID>
    <LinkedPropertyScreen>CollationInformationOfContractDocument</Linked
    PropertyScreen>
    //DEFINE AN IMAGE CONVERSION PROCESS OF IMAGE DATA
    <Plugin>
        <PluginID>ImageConverter</PluginID>
        <PluginType>Filter</PluginType>
        <Parameters>
            <FileFormat>PDF</FileFormat>
        </Parameters>
        <Next>
            //DEFINE A PROCESS OF DELIVERING THE IMAGE DATA TO A
            FOLDER AFTER THE IMAGE CONVERSION PROCESS
            <Plugin>
                <PluginID>ToFolder</PluginID>
                <PluginType>Output</PluginType>
                <Parameters>
                    <FileName>ContractDocument30_XYZ</FileName>   ←——1601
                    <Destinations>
                        <Path>¥¥111.111.111.111¥Folder_1</Path>
                        <Path>¥¥111.111.111.111¥Folder_2</Path>
                    </Destinations>
                </Parameters>
            </Plugin>
        </Next>
    </Plugin>
    //DEFINE A PROCESS OF EMAILING THE IMAGE DATA EXECUTED IN
    PARALLEL WITH THE PROCESSES DESCRIBED ABOVE
    <Plugin>
        <PluginID>ToEmail</PluginID>
        <PluginType>Output</PluginType>
        <Parameters>
            <SmtpServer>111.111.111.111</SmtpServer>
            <Sender>abc@xxx.yyy.com</Sender>
            <Subject>ContractDocument30</Subject>   ←————1602
            <Body>Contractee:XYZ</Body>   ←————1603
            <FileName>ContractDocument30_XYZ</FileName>   ←————1604
            <Destinations>
                <Address>dest1@xxx.yyy.com</Address>
                <Address>dest2@xxx.yyy.com</Address>
            </Destinations>
        </Parameters>
    </Plugin>
</Distribution>
```

INFORMATION PROCESSING DEVICE, IMAGE FORMING APPARATUS, AND PROCESS CONTROL SYSTEM

CROSS-REFERENCE TO RELATED APPLICATIONS

The present application claims priority to and incorporates by reference the entire contents of Japanese priority documents, 2006-251185 filed in Japan on Sep. 15, 2006 and 2007-212856 filed in Japan on Aug. 17, 2007.

BACKGROUND OF THE INVENTION

1. Field of the Invention

The present invention relates to an information processing device, an image forming apparatus, and a process control system including the information processing device and the image forming apparatus.

2. Description of the Related Art

In recent years, use of network-based multifunction products (MFPs) is becoming increasingly popular. Such MFPs are playing an important role in streamlining the business work, and particularly in data-delivery management systems that convert paper documents into electronic data and distribute it over a network. The important components of a conventional data-delivery management system are image readers such as scanners and data-delivery management servers. A data-delivery management server is registered with a plurality of delivery processes. A user can select a desired delivery process from an operation panel of the data-delivery management server and instruct the scanner to start scanning a document. After the scanned document is delivered to a destination in electronic form, the user can alter collation information regarding the scanned document.

Japanese Patent Application Laid-Open No. 2003-032425 discloses a delivery system for scanned image data in which image data of a scanned document is sent to a remote server for data management and billing management (refer to FIG. 21A). A scanner scans a document and retrieves image data of the document. The image data is transferred through a network to a remote server where it is stored and managed. When there is a request for the image data, the remote server sends it to the source of request (e.g., a personal computer) through the network.

Japanese Patent Application Laid-Open No. 2004-171199 discloses a document management system with an automatic delivery function in which information about a destination folder is provided at a predetermined area of image data of a scanned document (refer to FIG. 21B). While scanning a document, a user can select a temporary folder to temporarily store the image data of the scanned document. When the scanning is complete, a delivery processing unit attaches information about the destination folder to the image data and then the image data is stored in the temporary folder. An optical character recognition (OCR) unit recognizes the information about the destination folder as a text data. Based on the text data, the image data is retransferred to the destination folder. Thus, the user's task of storing a scanned document in the destination folder is simplified. The automatic delivery function can also be implemented when the scanner sequentially scans a plurality of documents.

Japanese Patent Application Laid-Open No. 2005-208934 discloses a document-delivery processing system that automatically performs necessary image processing on a scanned document and delivers the image data to a predetermined destination (refer to FIG. 21C). In the document-delivery processing system, an OCR form sheet is provided on the first page of a document to be scanned. When the document is scanned, an OCR form recognizing unit recognizes from the OCR form sheet the code-data corresponding to the image processing menus defined in the OCR form sheet and the area-data corresponding to an area on the image data on which image processing is to be performed. A document-data extracting unit extracts the code-data and the area-data recognized by the OCR form recognizing unit. An image processing unit performs image processing corresponding to the code-data within the area indicated in the area-data. A document-data delivery unit then delivers the processed image data to a predetermined destination.

However, in case of using a conventional data-delivery management system, the user cannot edit collation information such as file name of an image-data file unless the image-data file is delivered to the desired destination. That is, only after the image-data file is delivered to the desired destination, the user can open the image-data file to edit the collation information. To repeat such a procedure for every image-data file is a cumbersome task. Moreover, when an image-data file is delivered to a plurality of destinations, the user has to edit the collation information of the image-data file at each destination. Furthermore, when an image-data file is sent from another user, it is difficult for the receiver to understand the contents of the image-data file just by referring to, e.g., the unedited file name at the time of delivery.

SUMMARY OF THE INVENTION

It is an object of the present invention to at least partially solve the problems in the conventional technology.

An information processing device according to one aspect of the present invention is configured to be connected to an image forming apparatus. The information processing device includes a first storage unit that stores therein entry-sheet-definition data for defining a collation-information entry sheet that is displayed on a screen of the image forming apparatus for entering collation information regarding image data stored in the image forming apparatus; a second storage unit that stores therein flow-definition data for defining at least one flow of at least one process to be executed with respect to the image data; a communication unit that sends the entry-sheet-definition data to the image forming apparatus before the image forming apparatus performs an image forming process, and receives image data and collation information corresponding to the image data after the image forming process is complete from the image forming apparatus; and a processing unit that associates received collation information with the flow-definition data based on contents of the collation information and executes at least one of the flows defined in the flow-definition data, which is associated with the collation information, with respect to the image data.

An image forming apparatus according to another aspect of the present invention includes an input unit for inputting image data; a first storage unit that stores therein entry-sheet-definition data for defining a collation-information entry sheet for entering collation information regarding image data; a second storage unit that stores therein flow-definition data for defining at least one flow of at least one process to be executed with respect to the image data; a display unit that displays the collation-information entry sheet on a screen based on the entry-sheet definition data; a retrieving unit that retrieves collation information corresponding to input image data from the collation-information entry sheet; and a processing unit that associates retrieved collation information with the flow-definition data based on contents of the collation information and executes at least one of the flows defined in the flow-definition data, which is associated with the collation information, with respect to the image data.

A process control system according to still another aspect of the present invention includes an image forming apparatus; and an information processing device connected to the image forming apparatus. The information processing device includes a first storage unit that stores therein entry-sheet-definition data for defining a collation-information entry sheet that is displayed on a screen of the image forming apparatus for entering collation information regarding image data stored in the image forming apparatus, a second storage unit that stores therein flow-definition data for defining at least one flow of at least one process to be executed with respect to image data, a communication unit that, upon receiving a request from the image forming apparatus, sends the entry-sheet-definition data to the image forming apparatus before the image forming apparatus performs an image forming process, and receives image data and collation information corresponding to the image data after the image forming process is complete from the image forming apparatus, and a processing unit that associates received collation information with the flow-definition data based on contents of the collation information and executes at least one of the flows defined in the flow-definition data, which is associated with the collation information, with respect to the image data. The image forming apparatus includes an input unit for inputting image data, a requesting unit that requests the information processing device to send the entry-sheet-definition data, a receiving unit that receives the entry-sheet-definition data from the information processing device, a display unit that displays the collation-information entry sheet on a screen based on the entry-sheet definition data, a retrieving unit that retrieves collation information that is entered by a user from the collation-information entry sheet, and a transmitting unit that transmits retrieved collation information to the information processing device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an exemplary XML program of the flow-definition data according to the first embodiment;

FIG. 5 is an exemplary XML program of entry-sheet definition data according to the first embodiment;

FIG. 9 is an exemplary schematic diagram of a character-attribute-setting dialogue box according to the first embodiment;

FIG. 10 is an exemplary schematic diagram of a numerical-attribute-setting dialogue box according to the first embodiment;

FIG. 16 is an exemplary XML program according to the first embodiment to merge the collation information into the flow-definition data;

DETAILED DESCRIPTION OF THE PREFERRED EMBODIMENTS

Exemplary embodiments of the present invention are described in detail below with reference to the accompanying drawings. The present invention is not limited to these exemplary embodiments.

An information processing device, an image forming apparatus, a processing control system, a processing control method, and a processing control program according to the exemplary embodiments can be implemented in any device, apparatus, or system that performs image processing.

The image forming apparatus according to the exemplary embodiments functions as a multifunction product (MFP) that houses a printer, a scanner, a copying machine, and a facsimile machine. However, the exemplary embodiments are also applicable to any standalone image forming apparatus such as a scanner, a facsimile machine, or a copying machine that performs interactive image processing.

Figure 1:
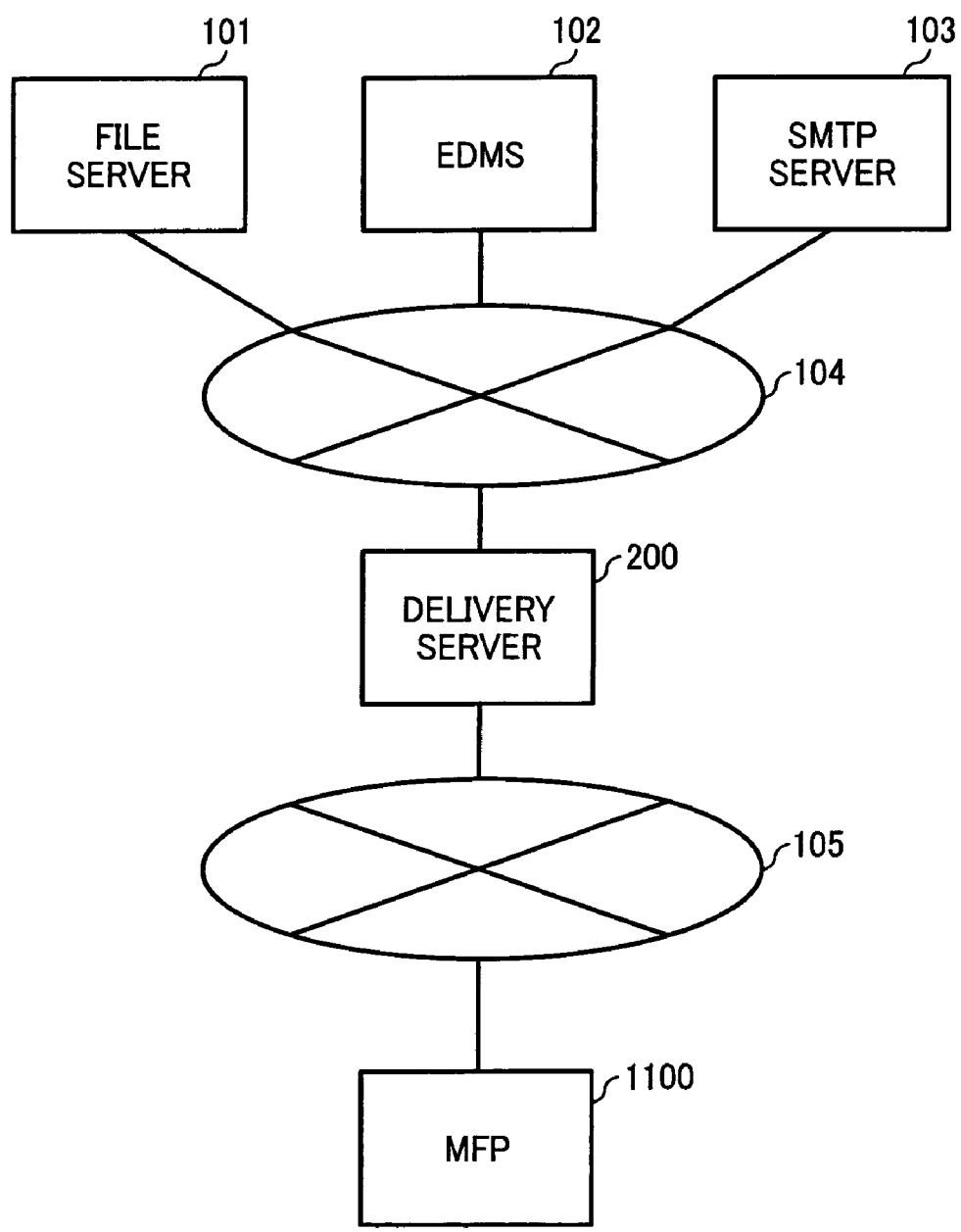
FIG. 1 is a schematic diagram of a network delivery system according to a first embodiment of the present invention.

FIG. 1 is a schematic diagram of a network delivery system according to a first embodiment of the present invention. The network delivery system includes a first network 104 such as Internet, a delivery server 200, a file server 101, an enterprise document management system (EDMS) 102, a simple mail transfer protocol (SMTP) server 103, a second network 105 such as a local area network (LAN) or Internet, and a multifunction product (MFP) 1100. The delivery server 200 is mutually connected with the file server 101, the EDMS 102, and the SMTP server 103 via the first network 104, and with the MFP 1100 via the second network 105.

The MFP 1100 houses a printer, a scanner, a copying machine, and a facsimile machine. The scanner of the MFP 1100 scans a paper document, generates image data corresponding to the paper document, and sends the image data to the delivery server 200. The structure of the MFP 1100 is described later in detail.

The delivery server 200 is a computer such as a workstation. Upon receiving the image data from the MFP 1100, the delivery server 200 executes various processes with respect to the image data based on a flow-definition data that is described later in detail.

The file server 101 is a computer for storing and managing files that are shared on Internet. The EDMS 102 is a document management system. The SMTP server 103 performs email communication by using the SMTP. The delivery server 200 delivers the image data to the file server 101, the EDMS 102, and the SMTP server 103.

Figure 2:
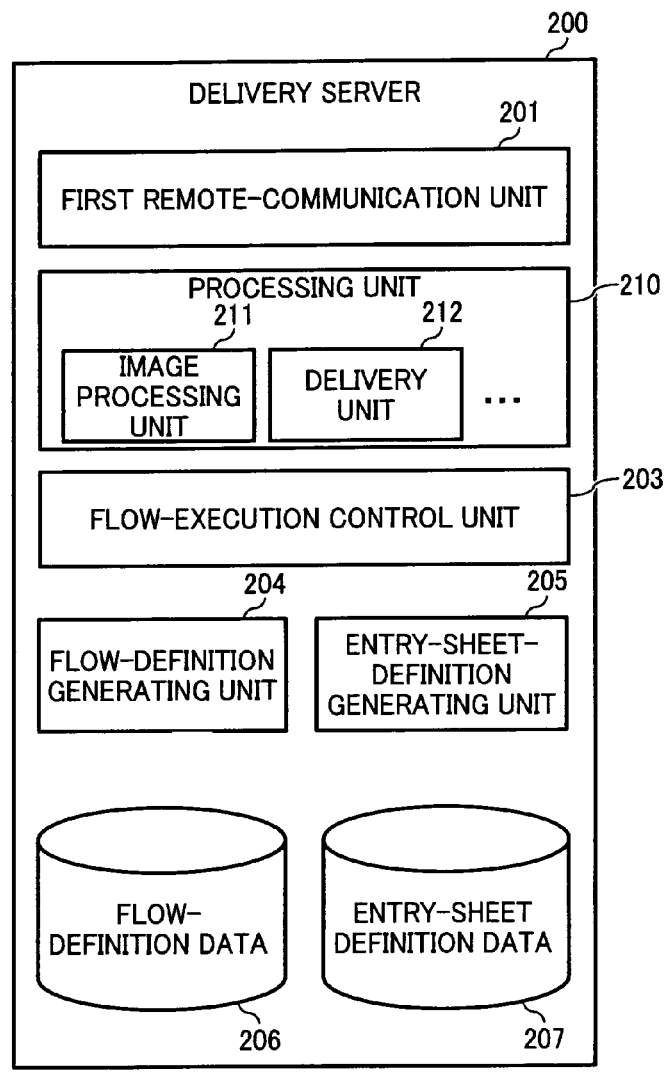
FIG. 2 is a functional block diagram of a delivery server shown in FIG. 1.

Given below is the detailed description of the delivery server 200. FIG. 2 is a functional block diagram of the delivery server 200. The delivery server 200 includes a first remote-communication unit 201, a processing unit 210, a flow-execution control unit 203, a flow-definition generating unit 204, an entry-sheet-definition generating unit 205, a flow-definition data 206, and an entry-sheet definition data 207.

In the flow-definition data 206, one or more flows are defined. Each flow includes one or more processes executed with respect to the image data. In the entry-sheet definition data 207, a collation-information entry sheet is defined that is displayed on a screen of the MFP 1100. A user enters collation information corresponding to the image data in the collation-information entry sheet. The collation information is necessary to define the flows of processes in the flow-definition data 206. Hence, the collation information (entry-sheet definition data 207) is associated with the flow-definition data 206. The flow-definition data 206 and the entry-sheet definition data 207 are separately stored in a storage device such as a hard disk drive (HDD), which is, e.g., partitioned into a first storage unit and a second storage unit. Detailed description of the flow-definition data 206 and the entry-sheet definition data 207 is given later.

The first remote-communication unit 201 communicates with the MFP 1100. Before scanning a document, the MFP 1100 requests the delivery server 200 for the entry-sheet definition data 207. Upon receiving the request from the MFP 1100, the first remote-communication unit 201 sends the entry-sheet definition data 207 to the MFP 1100. After scanning of the document is complete, the MFP 1100 sends to the first remote-communication unit 201 image data corresponding to the scanned document and the collation information corresponding to the image data.

The processing unit 210 executes the processes defined in the flow-definition data 206. The processing unit 210 includes an image processing unit 211 that performs processes such as image conversion of the image data and a delivery unit 212 that delivers the image data to the file server 101, the EDMS 102, the SMTP server 103, and the MFP 1100.

The flow-execution control unit 203 retrieves the flow-definition data 206 from the HDD and controls the processing unit 210. That is, first, the flow-execution control unit 203 merges the collation information into the flow-definition data 206 thereby associating the collation information with the flow-definition data 206. Then, the flow-execution control unit 203 controls the processes to be executed with respect to the image data based on the flow-definition data 206.

The flow-definition generating unit 204 generates or edits the flow-definition data 206 upon receiving instructions from a system administrator of the delivery server 200 and then saves the flow-definition data 206 in the HDD.

The entry-sheet-definition generating unit 205 generates or edits the entry-sheet definition data 207 upon receiving instructions from the system administrator and then saves the entry-sheet definition data 207 in the HDD.

The processes of generating the flow-definition data 206 and the entry-sheet definition data 207 are described later in detail.

Given below is the description of the flow-definition data 206. A flow is a sequence of various processes executed with respect to the image data, which is generated in the MFP 1100. The processes are of two types, viz., delivery processes for delivering the image data to various destinations and intermediate processes that are executed before the delivery processes. Various types of flows are defined in the flow-definition data 206. For example, a flow of only the intermediate processes, a flow of a combination of the intermediate processes and the delivery processes, or a flow of only the delivery processes are defined in the flow-definition data 206. Moreover, the flow-definition data 206 can be programmed such that various flows are executed in parallel.

By executing the delivery processes, the image data is delivered to various destinations such as the MFP 1100, a personal computer connected to the first network 104 or the second network 105, the file server 101, or a web server. Moreover, the image data can be emailed by using the SMTP server 103. An example of the intermediate processes is an image conversion process that converts the image data into a predetermined format.

Figure 3:
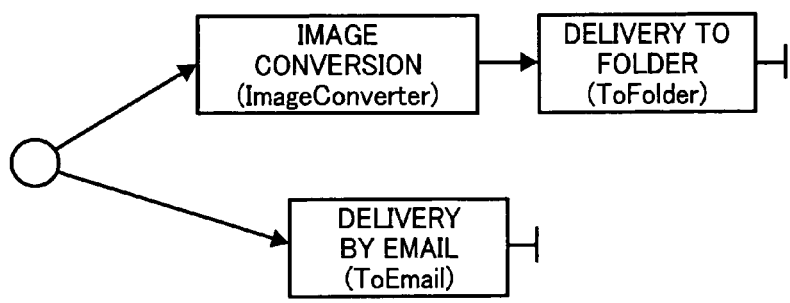
FIG. 3 is an exemplary schematic diagram of flows of processes defined in flow-definition data according to the first embodiment.

FIG. 3 is an exemplary schematic diagram of the flows of processes defined in the flow-definition data 206. In FIG. 3, two flows of processes for delivering image data are defined in the flow-definition data 206. The image data used in FIG. 3 is generated by scanning a contract document. In the first flow of processes, the image data corresponding to the scanned contract document is subjected to image conversion and then delivered to an image-data folder. In the second flow of processes, the image data is emailed to a specific address. Both the flows of processes are executed in parallel.

The flow-definition data 206 is programmed in the extended markup language (XML) format. FIG. 4 is an exemplary XML program of the flow-definition data 206. In FIG. 4, the flows of processes regarding the scanned contract document referred in FIG. 3 are defined in the flow-definition data 206. The flow-definition data 206 is programmed by using a plurality of tags that function as descriptors.

A tag <ID> sets a distinct flow-ID for each flow. A tag <Plugin> indicates the processes included in a flow. A tag <PluginID> sets a distinct process-ID for each process. When the tag <PluginID> is set to <ImageConverter>, the process of image conversion is executed. When the tag <PluginID> is set to <ToFolder>, the image data is delivered to a specific folder. When the tag <PluginID> is set to <ToEmail>, the image data is emailed to a specific address.

A tag <PluginType> indicates the type of a process referred by the tag <PluginID>. When the tag <PluginType> is set to <Filter>, an intermediate process is executed, while when the tag <PluginType> is set to <Output>, a delivery process is executed.

The tag <Parameter> sets an input-value to each type of collation information that is entered by a user from the collation-information entry sheet displayed on the MFP 1100. As shown in FIG. 4, each input-value of the collation information is inserted within one of the curly brackets indicated by numerals 401 to 404 to form delivery parameters for further processing. Thus, the flow-definition data 206 also functions as a delivery-parameter setting data.

Given below is the description of the entry-sheet definition data 207 that defines the configuration of the collation-information entry sheet. The collation-information entry sheet is displayed on the MFP 1100 such that a user can enter the collation information necessary to define the flows of processes in the flow-definition data 206. The entry-sheet definition data 207 is also programmed in the XML format. FIG. 5 is an exemplary XML program of the entry-sheet definition data 207. The entry-sheet definition data 207 in FIG. 5 corresponds to the collation-information entry sheet used to enter the collation information, which is inserted in the flow-definition data 206 referred in FIGS. 3 and 4.

As shown in FIG. 5, the entry-sheet definition data 207 is programmed by using a plurality of tags. A tag <ID> sets a distinct data-ID for the entry-sheet definition data 207. A tag <Items> sets an input-field for entering the collation information. A user is asked to enter the collation information from the input-field displayed on the collation-information entry sheet. The input-field includes one or more display-names and conditions applicable to each display-name.

In the example of the entry-sheet definition data 207 shown in FIG. 5, a user is asked to enter the name of contractee and the contract number as the display-names (DisplayName). Each display name has an input-attribute such as a character attribute or a numerical attribute. For example, in FIG. 5, the name of contractee is a display name having the character attribute, while the contract number is a display name having the numerical attribute. In case of a display name having the character attribute, various conditions such as setting maximum length of the input-field (MaxLength), setting the input-field as a password (IsPassword), and setting a validation string for the input-field (ValidationString) can be applied. If the 'IsPassword' is set to 'true', the values in the input-fields are masked in asterisks (*) while being entered by the user. In case of a display name having the numerical attribute, various conditions such as setting maximum value of the display name (MaxValue) or setting minimum value of the display name (MinValue) can be applied.

When a user instructs the MFP 1100 to scan a document, the MFP 1100 requests the delivery server 200 for the entry-sheet definition data 207. The delivery server 200 then sends to the MFP 1100 the entry-sheet definition data 207 corresponding to the flows of processes selected by the user and to be executed with respect to image data of the scanned document.

Given below is the process of generating the flow-definition data 206 by the flow-definition generating unit 204. The flow-definition generating unit 204 displays on a display device (not shown) of the delivery server 200 a flow-definition-data generating screen. A system administrator enters information regarding one or more flows of processes to be defined in the flow-definition data 206 from the flow-definition-data generating screen. The flow-definition generating unit 204 then generates the flow-definition data 206 in the XML format by using the information entered by the system administrator.

Figure 6:
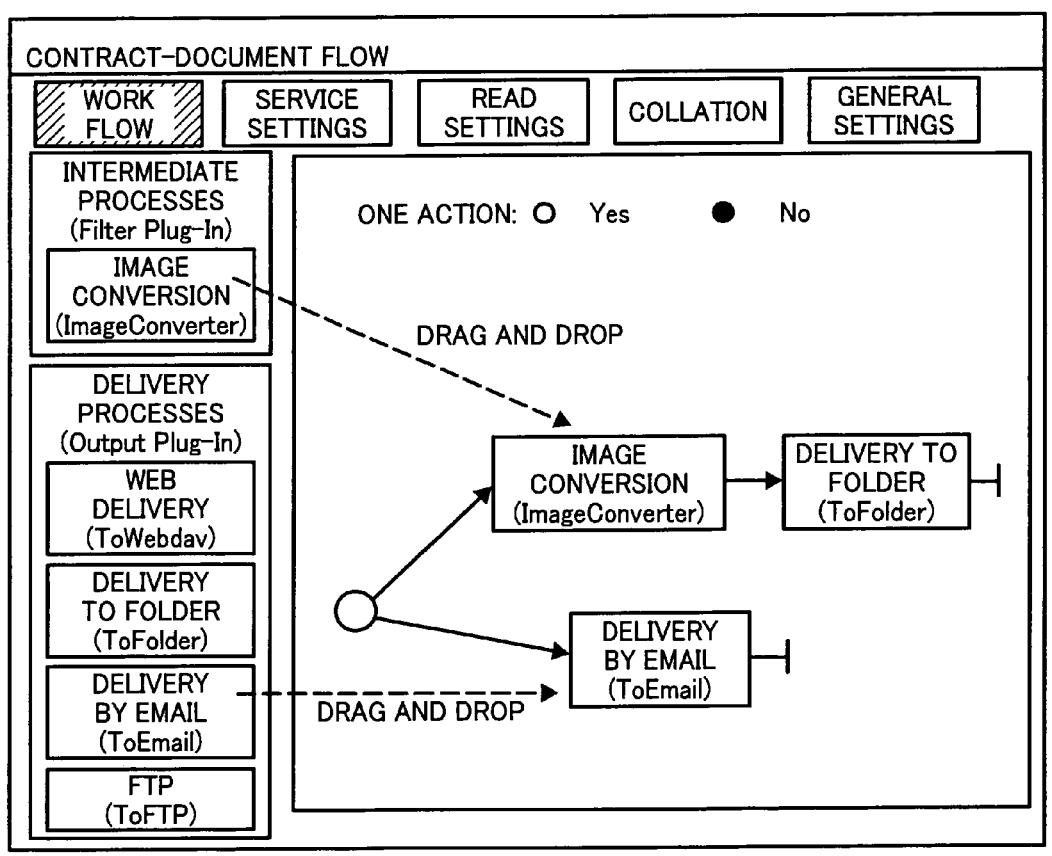
FIG. 6 is an exemplary schematic diagram of a flow-definition-data generating screen according to the first embodiment.

FIG. 6 is an exemplary schematic diagram of a flow-definition-data generating screen displayed to the system administrator. The flow-definition-data generating screen in FIG. 6 is used to generate the two flows of processes referred in FIGS. 3 and 4.

In the left portion of the flow-definition-data generating screen in FIG. 6, a list of buttons corresponding to the intermediate processes and the delivery processes is provided. To define one or more flows of processes, the system administrator presses the desired buttons and places those buttons in the right portion of the flow-definition-data generating screen by using the drag-and-drop technique. The two flows of processes, also referred in FIG. 3, are shown in the right portion of the flow-definition-data generating screen in FIG. 6. In the first flow of processes, image data corresponding to a scanned document (indicated by a circle) is subjected to image conversion and then delivered to an image-data folder. In the second flow of processes, the image data is emailed to a specific address. Both the flows of processes are executed in parallel. When the system administrator right-clicks on a button placed in the right portion of the flow-definition-data generating screen, the flow-definition generating unit 204 displays a process-setting dialogue box corresponding to the right-clicked button. The system administrator can enter details of a process corresponding to the right-clicked button from the process-setting dialogue box or use the collation information as parameters to specify the details of the process by using the process-setting dialogue box.

Figures 7, 8:
FIG. 7 is an exemplary schematic diagram of a process-setting dialogue box according to the first embodiment.
FIG. 8 is an exemplary schematic diagram of an entry-sheet-definition-data generating screen according to the first embodiment.

FIG. 7 is an exemplary schematic diagram of a process-setting dialogue box used to specify details for emailing image data. In the process-setting dialogue box shown in FIG. 7, the document name of a scanned contract document to be attached to the email and the body text of the email is composed by using the collation information entered by a user. The collation information is retrieved from XML tags of an attribute-setting dialogue box displayed at the time of generating the entry-sheet definition data 207. The attribute-setting dialogue box is described later in detail.

After the system administrator defines one or more flows of processes by using the flow-definition-data generating screen, the flow-definition generating unit 204 analyzes the order of processes in each flow from the position coordinates of the buttons placed in the right portion of the flow-definition-data generating screen. The flow-definition generating unit 204 also retrieves the details of each process from the corresponding process-setting dialogue box. Subsequently, the flow-definition generating unit 204 sets a process-ID for each process and merges the process-ID with the contents of the corresponding process-setting dialogue box. The flow-definition generating unit 204 then converts the merged information into the XML format by using XML tags. As a result, the flow-definition data 206 is generated (refer to FIG. 4). The flow-definition generating unit 204 saves the flow-definition data 206 in the HDD.

Given below is the process of generating the entry-sheet definition data 207 by the entry-sheet-definition generating unit 205. The entry-sheet-definition generating unit 205 displays on a display device (not shown) of the delivery server 200 an entry-sheet-definition-data generating screen. The system administrator enters information regarding the entry-sheet definition data 207 from the entry-sheet-definition-data generating screen. The entry-sheet-definition generating unit 205 then generates the entry-sheet definition data 207 in the XML format by using the information entered by the system administrator.

FIG. 8 is an exemplary schematic diagram of the entry-sheet-definition-data generating screen. The entry-sheet definition data 207 generated from the entry-sheet-definition-data generating screen in FIG. 8 is used to display the collation-information entry sheet from which a user enters the collation information, which is merged in the flow-definition data 206 corresponding to the contract document referred in FIGS. 3 and 4. As shown in FIG. 8, various types of entry-items for entering the collation information can be set in the entry-sheet-definition-data generating screen. The types of entry-items shown in FIG. 8 are a character type item, a numerical type item, a date type item, a combo-box type item, and a checkbox type item.

The collation-information entry sheet is displayed on the screen of the MFP 1100. The system administrator determines the screen design of the collation-information entry sheet by using the entry-sheet-definition-data generating screen. That is, the system administrator can determine which entry-items to display on the collation-information entry sheet. When an entry-item is to be hidden on the collation-information entry sheet to disallow the user to enter collation information regarding that particular entry-item, the system administrator sets a fixed value to that entry-item.

The system administrator can also set an initial value to each entry-item that is to be displayed on the collation-information entry sheet. When the system administrator double-clicks on an entry-item, the entry-sheet-definition generating unit 205 displays on the display device (not shown) an attribute-setting dialogue box based on the type of the double-clicked entry-item. The system administrator can set the details regarding the entry-item from the attribute-setting dialogue box.

FIG. 9 is an exemplary schematic diagram of the attribute-setting dialogue box for setting details of a character type item of the collation information. As shown in FIG. 9, various attributes can be set for a character type item of the collation information. The attributes set in FIG. 9 are as follows: option to allow the user to edit the collation information, option to make entry in each input-field mandatory, display name of the entry-item, tag name of the entry-item when converted in the XML format, maximum length of characters in the entry-item, option to display or hide a password, and validation string. When the option to allow the user to edit the collation information is set to 'false', the entry-item with fixed values is displayed on the screen and the user cannot edit the values. The display name is displayed as the title on the left side of the collation-information entry sheet. When the option to display the password is set to 'true', the values in the input-fields are masked in asterisks (*) while being entered by the user. The validation string is a regular expression for validating the entry-item. For example, if the validation string is set to 'A*', a user can enter a string starting only with letter 'A'. When a user enters a string not matching with the condition in the validation string, an error message is displayed on the collation-information entry sheet.

FIG. 10 is an exemplary schematic diagram of the attribute-setting dialogue box for setting details of a numerical type item of the collation information. As shown in FIG. 9, various attributes can be set for a numerical type item of the collation information. The attributes set in FIG. 10 are as follows: option to allow the user to edit the collation information, option to make entry in each input-field mandatory, display name of the entry-item, tag name of the entry-item when converted into the XML format, maximum value of the entry-item, and minimum value of the entry-item.

After the system administrator sets conditions for entry-items of the collation information from the entry-sheet-definition-data generating screen, the entry-sheet-definition generating unit 205 retrieves the contents of the entry-sheet-definition-data generating screen and the corresponding attribute-settings dialogue boxes. The entry-sheet-definition generating unit 205 then sets the data-ID for the entry-sheet definition data 207 and merges the contents of the entry-sheet-definition generating unit 205 with the contents of the corresponding attribute-settings dialogue boxes. The entry-sheet-definition generating unit 205 converts the merged information into XML format by using XML tags. As a result, the entry-sheet definition data 207 is generated (refer to FIG. 5). The entry-sheet-definition generating unit 205 saves the entry-sheet definition data 207 in the HDD.

Figure 11:
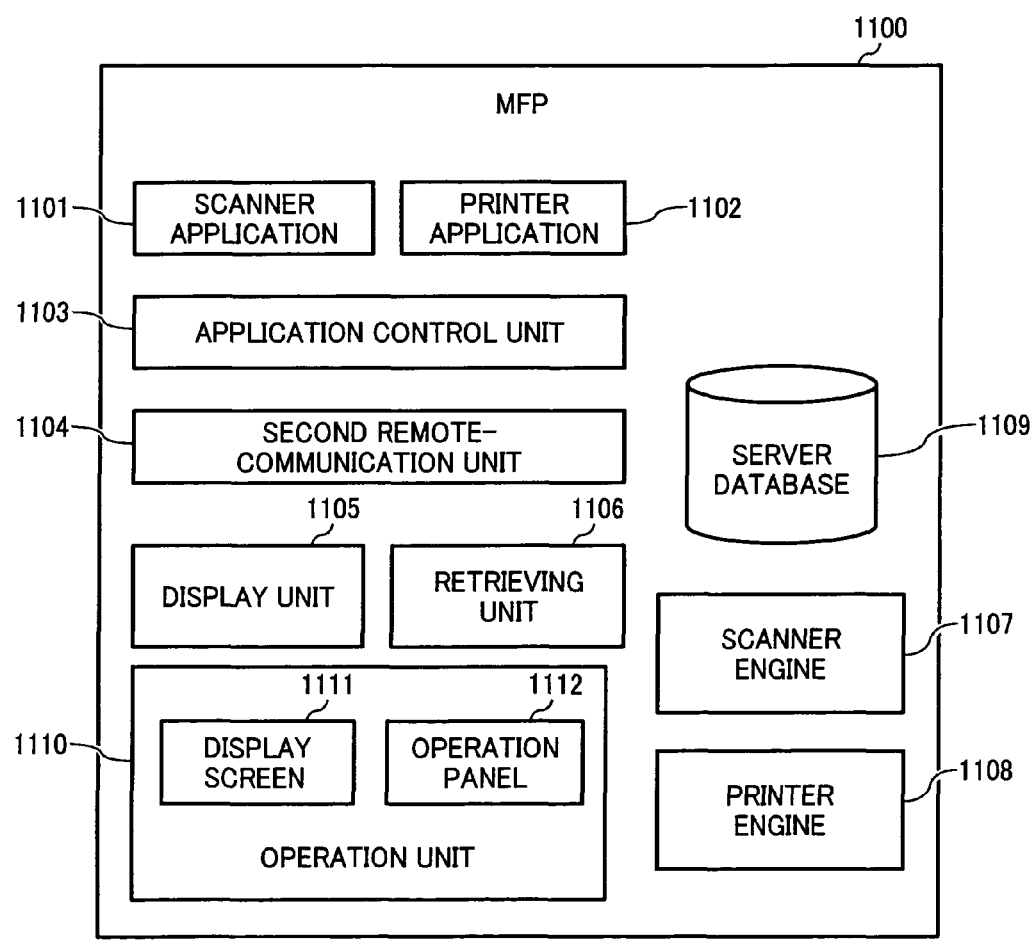
FIG. 11 is a functional block diagram of an image forming apparatus shown in FIG. 1.

Given below is the description of the MFP 1100. FIG. 11 is a functional block diagram of the MFP 1100. The MFP 1100 includes a scanner application 1101, a printer application 1102, an application control unit 1103, a second remote-communication unit 1104, a display unit 1105, a retrieving unit 1106, a scanner engine 1107, a printer engine 1108, a server database 1109, and an operation unit 1110.

The server database 1109 stores therein information such as the IP address of the delivery server 200. The server database 1109 is stored in a storage device such as the HDD.

The scanner engine 1107 is a hardware component that performs scanning, while the printer engine 1108 is a hardware component that performs printing. The operation unit 1110 includes a screen 1111 and an operation panel 1112 that is equipped with various button such as a start button, a stop button, a print button, and a scan button.

Upon receiving requests from the scanner application 1101 or the printer application 1102, the application control unit 1103 controls the operation of the scanner engine 1107 or the printer engine 1108, or the data retrieval from the storage device.

The second remote-communication unit 1104 communicates with the delivery server 200, i.e., with the first remote-communication unit 201. The second remote-communication unit 1104 requests the delivery server 200 to send a flow selection screen and the entry-sheet definition data 207, and receives the same from the delivery server 200. On the other hand, based on the IP address of the delivery server 200 stored in the server database 1109, the second remote-communication unit 1104 sends to the delivery server 200 flow-IDs of flows selected by a user from the flow selection screen, image data corresponding to a scanned document, and collation information corresponding to the image data. As described above, the collation information is entered by a user in the collation-information entry sheet that is defined by the entry-sheet definition data 207.

After the second remote-communication unit 1104 receives the entry-sheet definition data 207 in the XML format, the display unit 1105 processes the entry-sheet definition data 207 and displays the collation-information entry sheet on the screen 1111 such that a user can enter the collation information in the collation-information entry sheet by touch input or from an on-screen software keyword.

When a user enters information from the screen 1111 or presses the buttons from the operation panel 1112, the retrieving unit 1106 recognizes each activity as an event and notifies the events to the scanner application 1101.

The retrieving unit 1106 also retrieves the values of the collation information entered in the collation-information entry sheet and converts them into the XML format.

When the user presses the scan button on the operation panel 1112, the scanner application 1101 sets scanning conditions and performs scanning. That is, the scanner application 1101 requests the application control unit 1103 to start the operation of the scanner engine 1107. After the scanner engine 1107 starts operating, the scanner application 1101 then scans a document and stores therein image data corresponding to the scanned document. When the user presses the scan button on the operation panel 1112, i.e., when the retrieving unit 1106 recognizes the pressing of the scan button, the scanner application 1101 instructs the second remote-communication unit 1104 to request the delivery server 200 to send the flow selection screen such that the user can select one or more flows of processes to be executed with respect to the scanned document. The scanner application 1101 also instructs the second remote-communication unit 1104 to request the delivery server 200 to send the entry-sheet definition data 207 such that the collation-information entry sheet is displayed on the screen 1111.

Similar to the scanner application 1101, when the user presses the print button from the operation panel 1112, the printer application 1102 requests the application control unit 1103 to start the operation of the printer engine 1108.

In FIG. 11, only the scanner application 1101 and the printer application 1102 are shown. However, the MFP 1100 is also equipped with other applications such as a copying application or a facsimile application.

Figure 12:
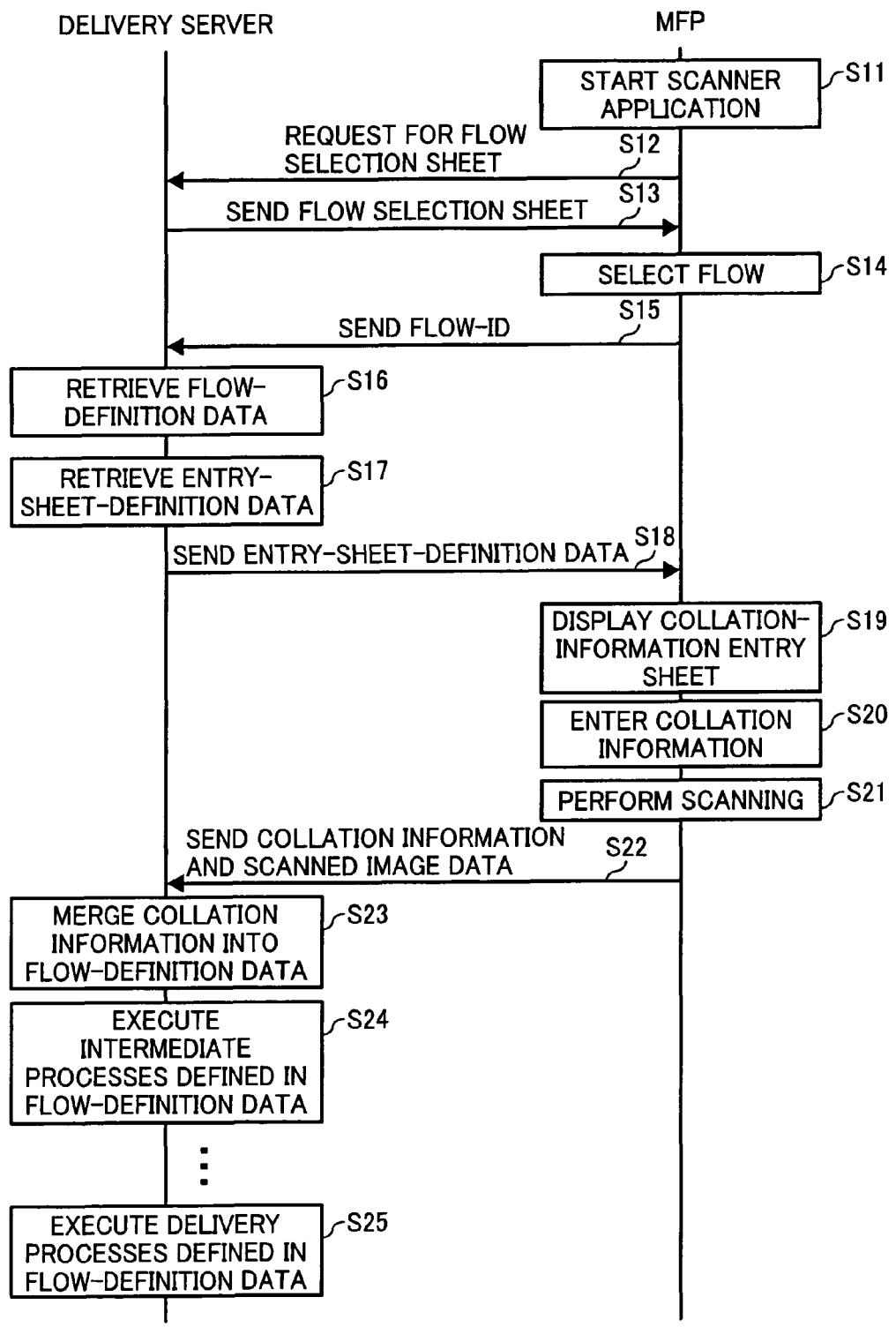
FIG. 12 is a sequence chart for explaining the sequence of operations performed in the network delivery system shown in FIG. 1.

Given below is the sequence of operations performed in the network delivery system according to the first embodiment. FIG. 12 is a sequence chart for explaining the sequence of operations performed in the network delivery system according to the first embodiment.

When a user presses the scan button on the operation panel 1112, the scanner application 1101 is activated (step S11). The scanner application 1101 instructs the second remote-communication unit 1104 to request the delivery server 200, the IP address of which is stored in the server database 1109, to send the flow selection screen (step S12). Upon receiving the request from the second remote-communication unit 1104, the first remote-communication unit 201 sends the flow selection screen to the MFP 1100 (step S13).

Figures 13, 14A, 14B, 15:
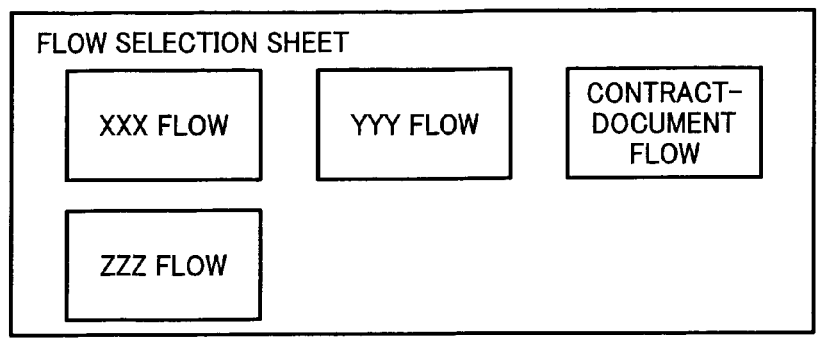
FIG. 13 is an exemplary schematic diagram of a flow selection screen according to the first embodiment.
FIG. 14A is an exemplary diagram of a collation-information entry sheet according to the first embodiment.
FIG. 14B is an exemplary schematic diagram of the collation-information entry sheet with collation information entered in it.
FIG. 15 is an exemplary program according to the first embodiment to convert collation information into XML format.

When the second remote-communication unit 1104 receives the flow selection screen, the display unit 1105 displays the flow selection screen on the screen 1111. FIG. 13 is an exemplary schematic diagram of the flow selection screen. Each button corresponding to a flow and displayed in the flow selection screen has a distinct flow-ID. The user selects one or more flows from the flow selection screen.

The retrieving unit 1106 recognizes the selection of flows made by the user (step S14). The second remote-communication unit 1104 then sends the flow-IDs of the selected flows to the delivery server 200 (step S15).

When the first remote-communication unit 201 receives the flow-IDs, the flow-execution control unit 203 retrieves the flow-definition data 206 corresponding to the flow-IDs from the HDD (step S16). The flow-execution control unit 203 then checks whether the entry-sheet definition data 207 is associated with the retrieved flow-definition data 206. If the entry-sheet definition data 207 is associated with the flow-definition data 206, the flow-execution control unit 203 retrieves the associated entry-sheet definition data 207 from the HDD (step S17). The first remote-communication unit 201 then sends the retrieved entry-sheet definition data 207 to the MFP 1100 (step S18).

When the second remote-communication unit 1104 receives the entry-sheet definition data 207, the display unit 1105 processes the entry-sheet definition data 207 and displays the collation-information entry sheet on the screen 1111 (step S19). FIG. 14A is an exemplary schematic diagram of the collation-information entry sheet that is defined by the entry-sheet definition data 207 regarding the contract document referred in FIG. 5.

A user enters the collation information in the collation-information entry sheet. FIG. 14B is an exemplary schematic diagram of the collation-information entry sheet with entered collation information. The retrieving unit 1106 retrieves the values of the collation information (step S20). The scanner application 1101 then requests the application control unit 1103 to start the operation of the scanner engine 1107. After the scanner engine 1107 starts operating, the scanner application 1101 scans a document (step S21). The scanner application 1101 converts the collation information into the XML format.

FIG. 15 is an exemplary program of converting the collation information entered by a user in FIG. 14B into the XML format. The second remote-communication unit 1104 sends to the delivery server 200 image data of the scanned document and the collation information in the XML format (step S22).

When the first remote-communication unit 201 receives the image data and the corresponding collation information, the flow-execution control unit 203 merges the collation information into the flow-definition data 206 (step S23). That is, the flow-execution control unit 203 inserts the values of the collation information within the curly brackets "{ }" indicated by the numerals 401 to 404 in the flow-definition data 206 (refer to FIG. 4). FIG. 16 is an exemplary XML program of the flow-definition data 206 in which the collation information is merged. In FIG. 16, the collation information entered by a user (refer to FIG. 15) is merged in the flow-definition data 206 shown in FIG. 4. The merged collation information in FIG. 16 is indicated by numerals 1601 to 1604 that correspond to the curly brackets indicated by the numerals 401 to 404 in FIG. 4.

The flow-execution control unit 203 then controls the processes to be executed with respect to the image data based on the flow-definition data 206 in which the collation information is merged. That is, when intermediate processes are defined in the flow-definition data 206, the flow-execution control unit 203 instructs the processing unit 210 to execute the intermediate processes (step S24). On the other hand, when delivery processes are defined in the flow-definition data 206, the flow-execution control unit 203 instructs the processing unit 210 to execute the delivery processes (step S25).

As described above, in the network delivery system according to the first embodiment, when the MFP 1100 starts scanning a document, a user is asked to enter in the collation-information entry sheet the collation information necessary to define one or more flows of processes to be executed with respect to image data of the scanned document. The flow-execution control unit 203 in the delivery server 200 merges the collation information into the flow-definition data 206 and controls the execution of the processes based on the flow-definition data 206 in which the collation information is merged. Because the collation information can be entered or edited, the user can have a better control on the execution of processes with respect to the image data.

To enable a user to execute various delivery processes in parallel, i.e., to enable a user to simultaneously deliver the image data to various destinations (e.g. delivering the image data to an image-data folder and emailing the image data to a specific address simultaneously), the entry-sheet definition data 207 can be configured such that the user can enter distinct collation information for each of the desired delivery processes. As described above, in the flow-definition data 206, the values of the collation information form the delivery parameters corresponding to each delivery process.

The entry-sheet definition data 207 can also be configured to maintain a log of entries in each entry-item of the collation information. The previous entries in the log can be made available on the screen 1111 for reselection thereby simplifying the user's job of entering the collation information.

Moreover, a variety of information can be stored in the scanner application 1101 and used as the collation information. For example, when a user logs into the MFP 1100 or the scanner application 1101, the login name of the user can be extracted from the login information and set as collation information in an entry-item such as 'user name'. Thus, the user need not enter the user name from the screen 1111. Similarly, the date and time of scanning can be set as collation information in an entry-item such as 'scanning date and time'. Moreover, a single flow of processes can be associated with multiple sets of the entry-sheet definition data 207 and the collation information corresponding to a plurality of documents in the same work category such that the documents can be efficiently delivered to various destinations. In that case, the user can be given the option to select the desired collation information (i.e., the documents) from the operation unit 1110.

Furthermore, information such as the IP address of the MFP 1100, login information of the delivery server 200, data size, or data format can also be automatically set as the collation information. For example, a tag <IPAddress> can be defined to set the IP address of the MFP 1100 as the collation information in the scanner application 1101.

Given below is the description of a network delivery system according to a second embodiment of the present invention. In the network delivery system according to the second embodiment, when a user instructs an MFP to scan a document, collation information entered by the user is validated at the time of executing a flow of processes. If the collation information is found out to be invalid, the user is asked to reenter the collation information and the scanning process is repeated.

The configuration of the network delivery system according to the second embodiment is identical to that according to the first embodiment (refer to FIG. 1). The configuration of the MFP 1100 according to the second embodiment is also identical to that according to the first embodiment (refer to FIG. 11).

Figure 17:
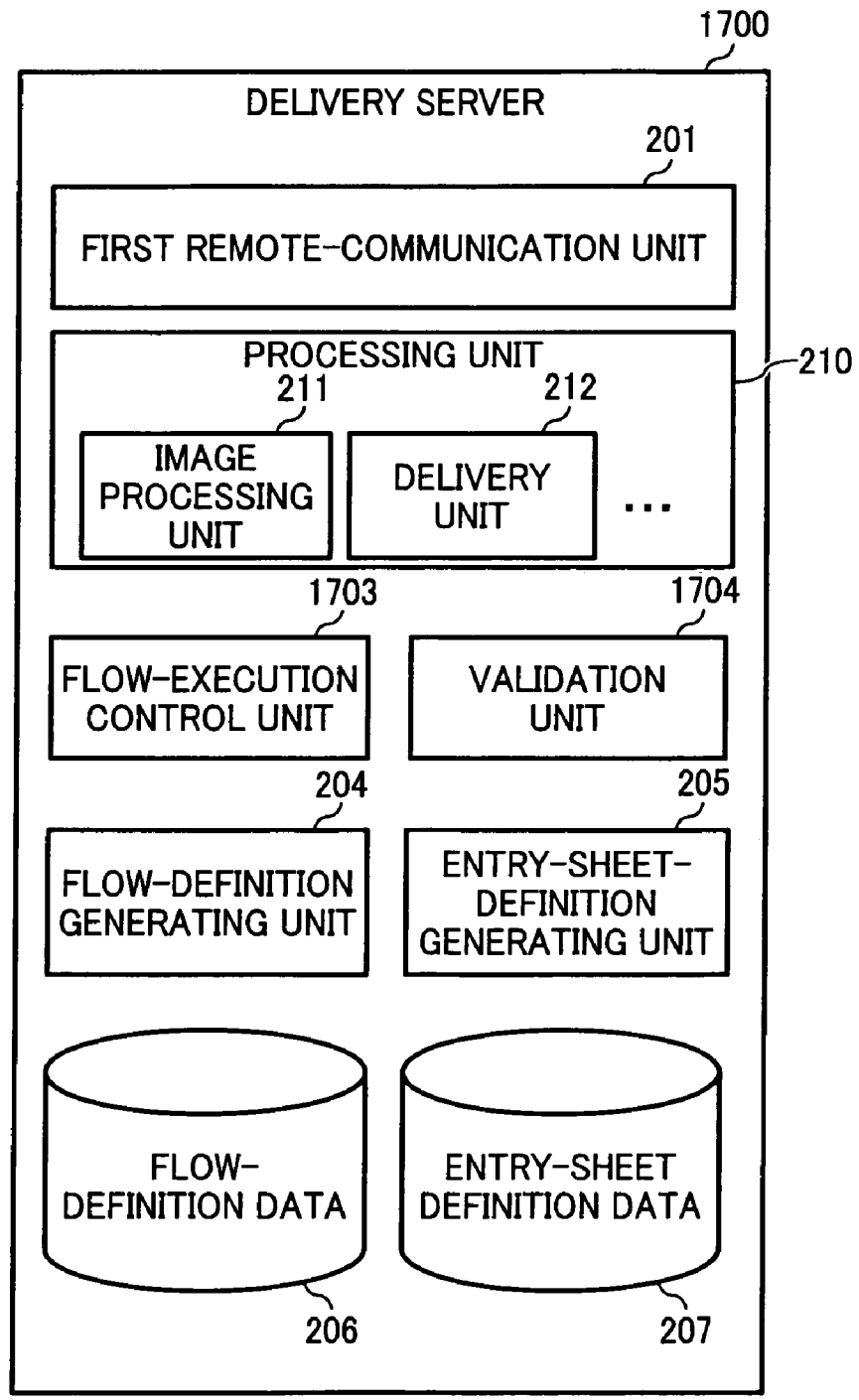
FIG. 17 is a functional block diagram of a delivery server according to a second embodiment of the present invention.

FIG. 17 is a functional block diagram of a delivery server 1700. The delivery server 1700 includes the first remote-communication unit 201, the processing unit 210, a flow-execution control unit 1703, a validating unit 1704, the flow-definition generating unit 204, the entry-sheet-definition generating unit 205, the flow-definition data 206, and the entry-sheet definition data 207.

The details of the first remote-communication unit 201, the processing unit 210, the flow-definition generating unit 204, the entry-sheet-definition generating unit 205, the flow-definition data 206, and the entry-sheet definition data 207 are identical to those according to the first embodiment.

The difference between the delivery server 200 according to the first embodiment and the delivery server 1700 according to the second embodiment is that the delivery server 1700 includes the validating unit 1704. The validating unit 1704 checks for consistency between image data of a scanned document and collation information regarding the image data received from the MFP 1100.

Besides having the functionality of the flow-execution control unit 203 according to the first embodiment, the flow-execution control unit 1703 instructs the first remote-communication unit 201 to resend the entry-sheet definition data 207 to the MFP 1100 when the validating unit 1704 finds inconsistency between the image data and the collation information. As a result, the collation-information entry sheet is redisplayed on the MFP 1100 such that the user can reenter appropriate collation information. Alternatively, the flow-execution control unit 1703 can be configured to instruct the MFP 1100 to repeat the scanning process.

For example, when the MFP 1100 scans an answer sheet of a questionnaire and sends image data regarding the scanned answer sheet to the delivery server 1700, the validating unit 1704 checks whether the answer sheet is filled correctly. If the validating unit 1704 finds any unanswered questions, the flow-execution control unit 1703 instructs the MFP 1100 to notify the user about the errors and ask the user to provide a corrected answer sheet for scanning.

In another case, e.g., when the MFP 1100 scans a form sheet and sends image data regarding the scanned form sheet to the delivery server 1700, the validating unit 1704 checks whether all the required items in the form sheet are filled. If the validating unit 1704 finds any unfilled entry-items, the flow-execution control unit 1703 instructs the MFP 1100 to notify the user about the errors and ask the user to provide a corrected form sheet for scanning.

In still another case, e.g., the user can instruct the MFP 1100 to scan only those documents that have 'AAA' as the title. The validating unit 1704 then checks whether a scanned document has 'AAA' as the title. In case of inconsistency, the validating unit 1704 instructs the MFP 1100 to notify the user to reenter the collation information or repeat the scanning process.

The validating processes are not limited to the validation conditions described above. Any other type of validating condition can be implemented. Moreover, the validation conditions for the validating unit 1704 can be set in each process-setting dialogue box. For example, if a validation process such as a form recognizing process or an optical character recognition (OCR) process is implemented as an intermediate process, the validating conditions regarding the process can be set in the corresponding process-setting dialogue box such that they are reflected in the flow-definition data 206. Moreover, the network delivery system can be configured such that a system administrator has the rights to determine whether to check for consistency while setting a process from the corresponding process-setting dialogue box. For example, when implementing a validation process, the system administrator can set an option to execute the validation process and set the validating conditions in case of implementing the validation process such that the option to validate and the validating conditions are reflected in the flow-definition data 206.

Figure 18:
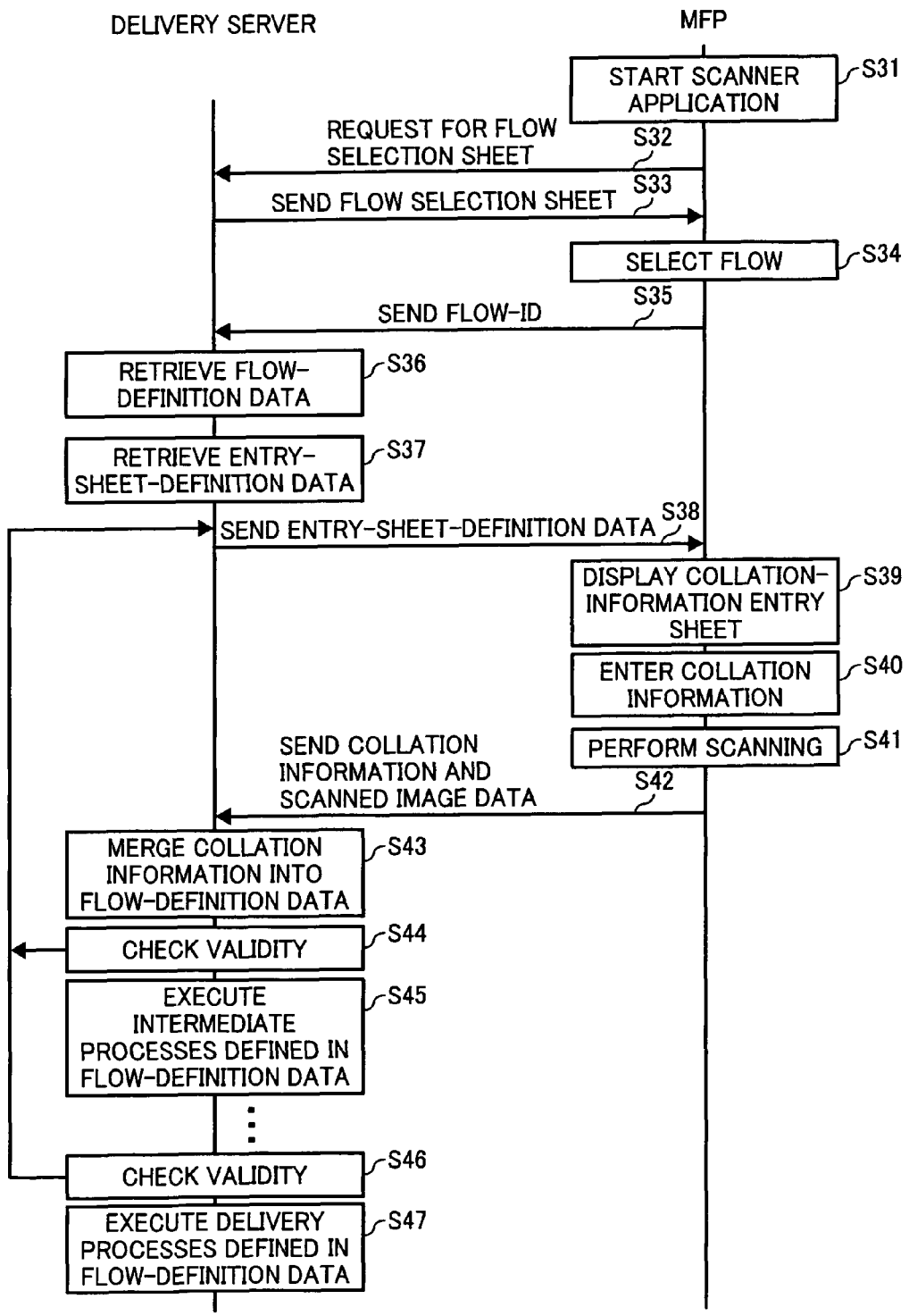
FIG. 18 is a sequence chart for explaining the sequence of operations performed in a network delivery system according to the second embodiment.

Given below is the sequence of operations performed in the network delivery system according to the second embodiment. FIG. 18 is a sequence chart for explaining the sequence of operations performed in the network delivery system according to the second embodiment.

In FIG. 18, the sequence of operations from activating the scanner application 1101 to merging the collation information into the flow-definition data 206, i.e. from step S31 to step S43, is identical to the sequence of operations according to the first embodiment and explained with reference to FIG. 12, i.e. from step S11 to step S23.

In FIG. 18, when the flow-execution control unit 203 merges the collation information into the flow-definition data 206 (step S43), the validating unit 1704 checks for consistency between image data of a scanned document and collation information regarding the image data received from the MFP 1100 (step S44). When the validating unit 1704 finds inconsistency between the image data and the collation information, the flow-execution control unit 1703 instructs the first remote-communication unit 201 to resend the entry-sheet definition data 207 to the MFP 1100 such that the user can reenter the collation information (step S38).

When the validating unit 1704 validates that the image data and the collation information are mutually consistent, the intermediate processes are executed based on the flow-definition data (step S45) identical to the intermediate processes according to the first embodiment, i.e., step S24 in FIG. 12. After the execution of the intermediate processes, the validating unit 1704 again checks for consistency between the image data and the collation information before executing the delivery processes (step S46). When the validating unit 1704 validates that the image data and the collation information are mutually consistent, the delivery processes are executed based on the flow-definition data (step S47) identical to the intermediate processes according to the first embodiment, i.e., step S25 in FIG. 12.

As described above with reference to FIG. 18, when the validating unit 1704 finds inconsistency between the image data and the collation information, the flow-execution control unit 1703 instructs the first remote-communication unit 201 to resend the entry-sheet definition data 207 to the MFP 1100. However, the network delivery system can be configured such that the flow-execution control unit 1703 instructs the first remote-communication unit 201 to send a rescanning request to the MFP 1100 such that the scanner application 1101 repeats the scanning process.

Thus, in the delivery server 1700, the validating unit 1704 checks for consistency between image data of a scanned document and collation information, which is entered by a user in the MFP 1100, at the time of executing a flow of processes. When the validating unit 1704 finds inconsistency between the image data and the collation information, the delivery server 1700 instructs the MFP 1100 to redisplay the collation-information entry sheet such that the user can reenter the appropriate collation information or to repeat the scanning process. As a result, any mistakes in the collation information or in the scanned document can be corrected before executing a flow of processes. Thus, the user can have a better control on the execution of processes with respect to the image data.

Given below is the description of a network delivery system according to a third embodiment of the present invention. In the network delivery system according to the first two embodiments, the execution of one or more flows of delivery processes was controlled by the delivery server 200 and the delivery server 1700. However, in the network delivery system according to the third embodiment, an MFP itself is configured to control the execution of one or more flows of delivery processes along with performing the scanning process.

Figure 19:
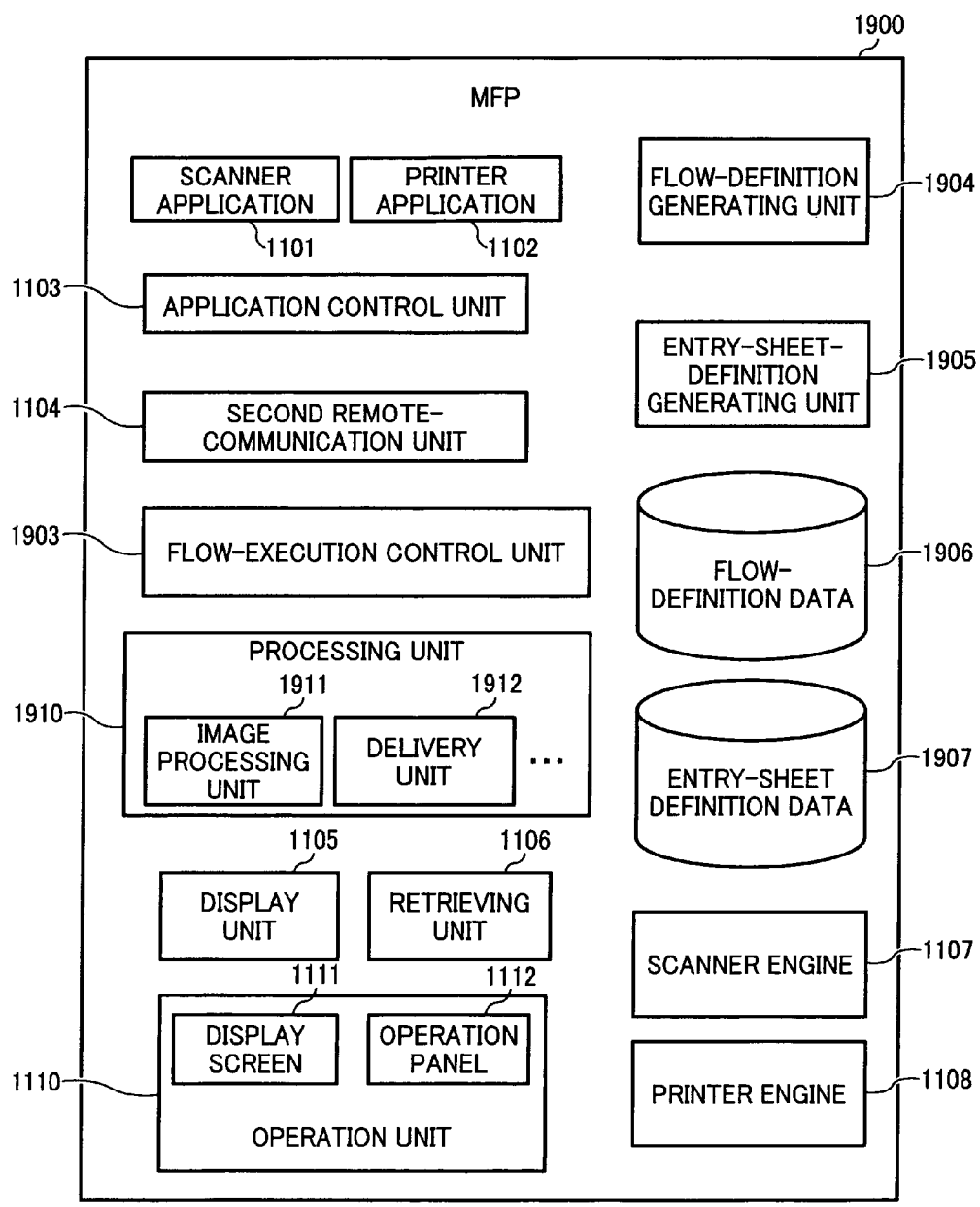
FIG. 19 is a functional block diagram of an image forming apparatus according to a third embodiment of the present invention.

FIG. 19 is a functional block diagram of an MFP 1900. The MFP 1900 includes the scanner application 1101, the printer application 1102, the application control unit 1103, the second remote-communication unit 1104, the display unit 1105, the retrieving unit 1106, the scanner engine 1107, the printer engine 1108, the operation unit 1110, a flow-execution control unit 1903, a flow-definition generating unit 1904, an entry-sheet-definition generating unit 1905, a flow-definition data 1906, an entry-sheet definition data 1907, and a processing unit 1910.

The details of the scanner application 1101, the printer application 1102, the application control unit 1103, the display unit 1105, the retrieving unit 1106, the scanner engine 1107, the printer engine 1108, and the operation unit 1110 are identical to those according to the first embodiment.

The details of the flow-definition data 1906, in which one or more flows are defined and each flow includes one or more processes executed with respect to image data, are identical to those of the flow-definition data 206 according to the first embodiment. Similarly, the details of the entry-sheet definition data 1907, in which a collation-information entry sheet is defined that is displayed on the operation unit 1110, are identical to those of the entry-sheet definition data 207 according to the first embodiment. The entry-sheet definition data 1907 is associated with the flow-definition data 1906.

The entry-sheet definition data 1907 and the flow-definition data 1906 are stored in a storage device such as the HDD.

The second remote-communication unit 1104 communicates with the other components of the MFP 1900 at the time of executing various processes. The processing unit 1910 executes the processes defined in the flow-definition data 1906. The processing unit 1910 includes an image processing unit 1911 that performs processes such as image conversion of the image data and a delivery unit 1912 that delivers the image data to the file server 101, the EDMS 102, and the SMTP server 103.

The flow-execution control unit 1903 retrieves the flow-definition data 1906 from the HDD and controls the processing unit 1910. That is, first, the flow-execution control unit 1903 merges collation information that is entered by a user into the flow-definition data 1906 thereby associating the collation information with the flow-definition data 1906. Then, the flow-execution control unit 1903 controls the processes to be executed with respect to the image data based on the flow-definition data 1906. The details of the operations performed by the flow-execution control unit 1903 are identical to those performed by the flow-execution control unit 203 according to the first embodiment.

The flow-definition generating unit 1904 generates or edits the flow-definition data 1906 upon receiving instructions from a system administrator of the MFP 1900 and then saves the flow-definition data 1906 in the HDD.

The entry-sheet-definition generating unit 1905 generates or edits the entry-sheet definition data 1907 upon receiving instructions from the system administrator and then saves the entry-sheet definition data 1907 in the HDD.

The processes of generating the flow-definition data 1906 and the entry-sheet definition data 1907 are identical to the processes of generating the flow-definition data 206 and the entry-sheet definition data 207 according to the first embodiment. Similar to the first embodiment, the flow-definition-data generating screen, the process-setting dialogue box, the collation-information entry sheet, and the attribute-setting dialogue box are displayed on the screen 1111 of the operation unit 1110.

Figure 20:
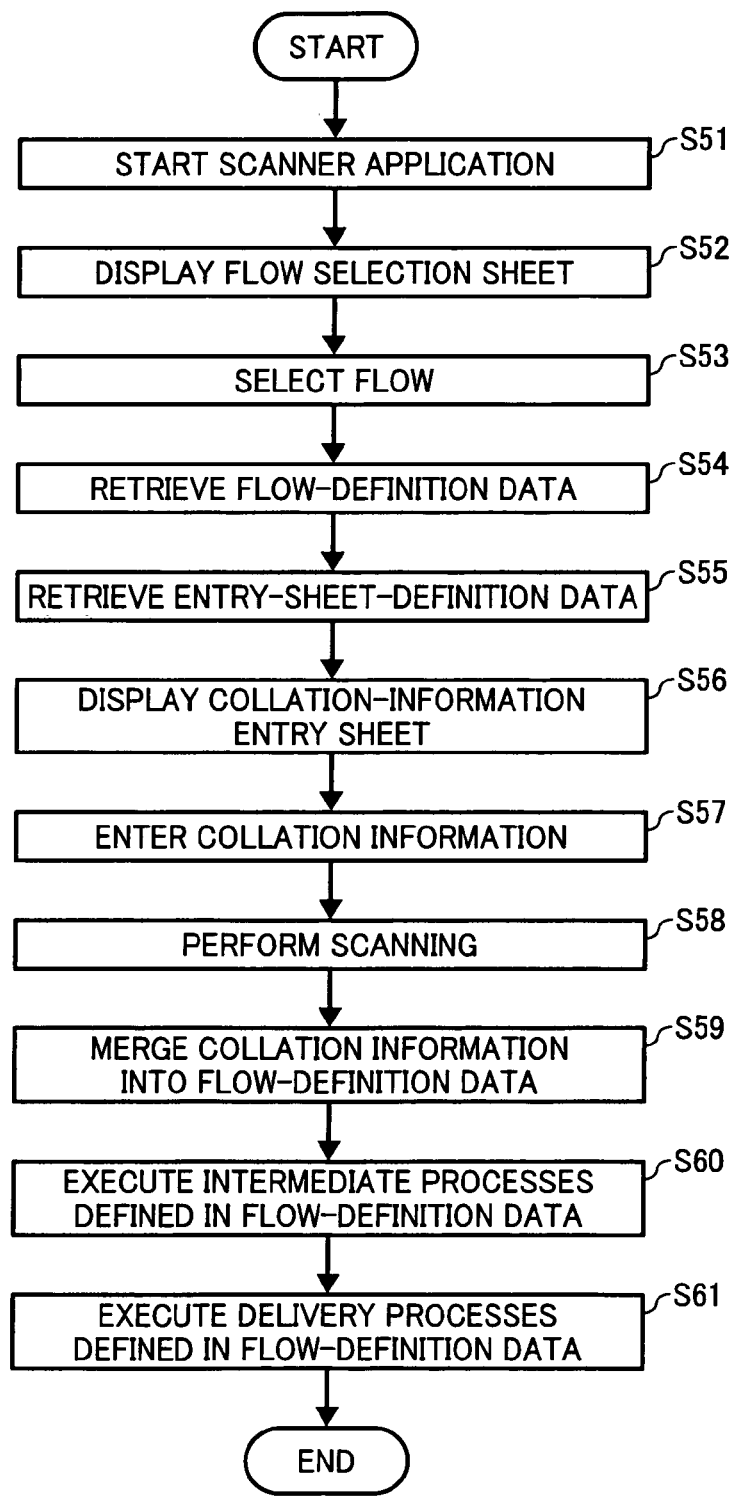
FIG. 20 is a sequence chart for explaining the sequence of operations performed by the image forming apparatus according to the third embodiment.
Figure 21A:
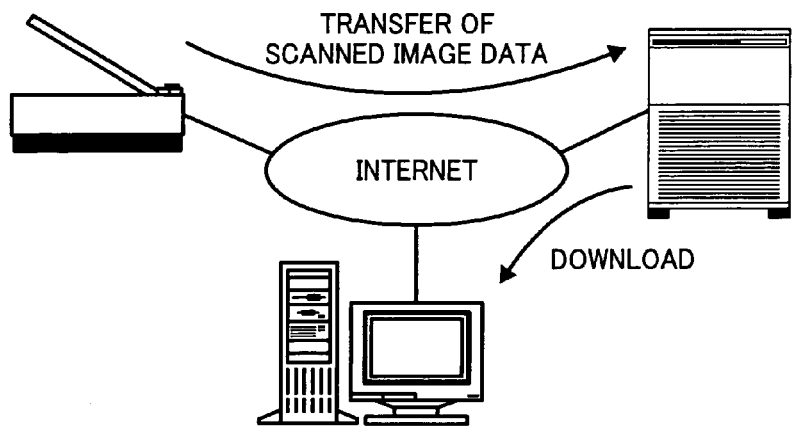
FIGS. 21A to 21C are diagrams for explaining conventional image-data-delivery controlling systems.
Figure 21B:
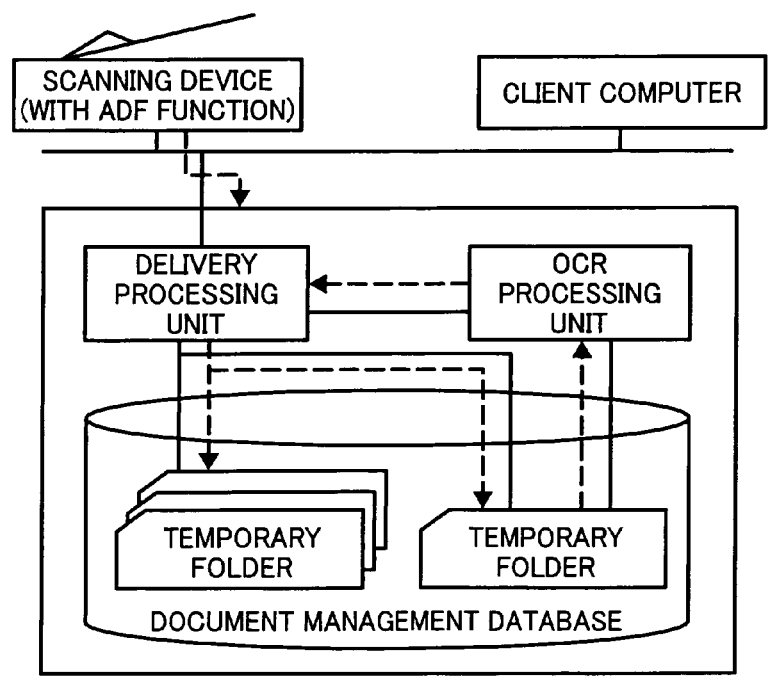
Figure 21C:
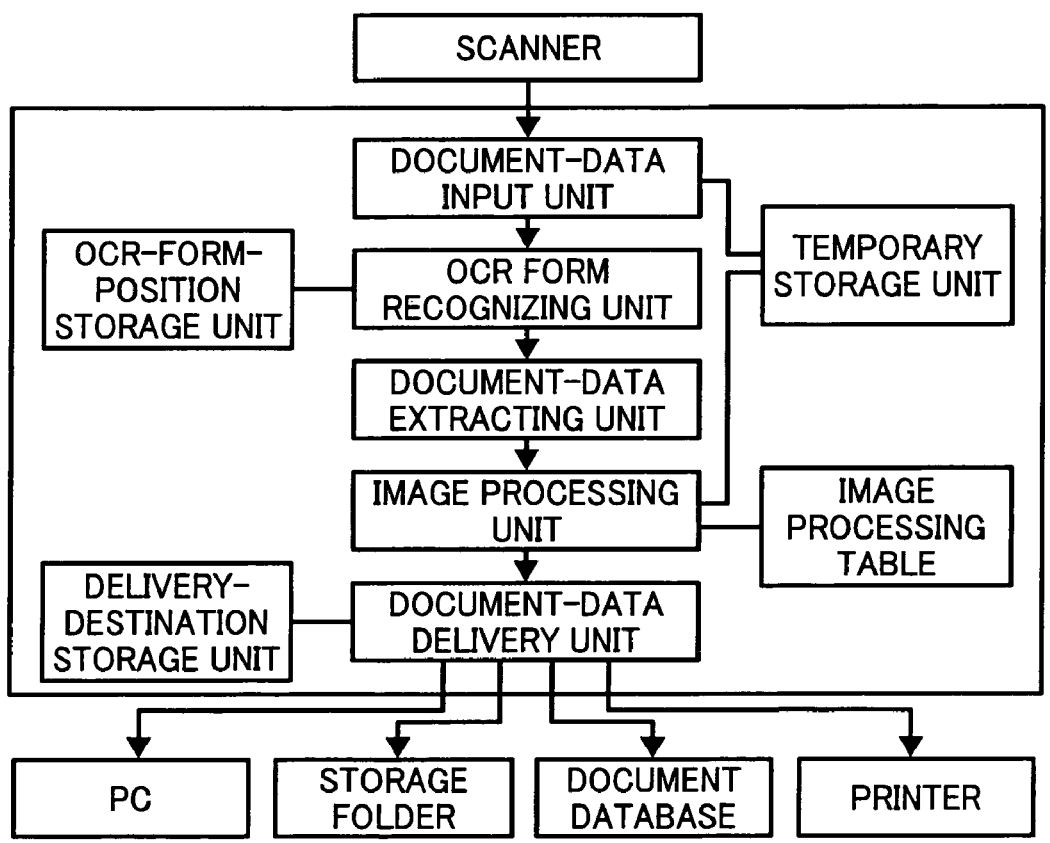

Given below is the sequence of operations performed by the MFP 1900. FIG. 20 is a sequence chart for explaining the sequence of operations performed by the MFP 1900.

When a user presses the scan button on the operation panel 1112 of the operation unit 1110, the scanner application 1101 is activated (step S51). The scanner application 1101 instructs the second remote-communication unit 1104 to display the flow selection screen (refer to FIG. 13) on the screen 1111 (step S52). The user selects one or more flows from the flow selection screen.

The retrieving unit 1106 recognizes the selection of flows made by the user (step S53). The flow-execution control unit 1903 retrieves the flow-definition data 1906 corresponding to flow-IDs of the selected flows from the HDD (step S54). The flow-execution control unit 1903 then checks whether the entry-sheet definition data 1907 is associated with the retrieved flow-definition data 1906. If the entry-sheet definition data 1907 is associated with the flow-definition data 1906, the flow-execution control unit 203 retrieves the associated entry-sheet definition data 1907 from the HDD (step S55). The display unit 1105 processes the entry-sheet definition data 1907 and displays the collation-information entry sheet (refer to FIG. 14A) on the screen 1111 (step S56).

The user enters the collation information in the collation-information entry sheet. The retrieving unit 1106 then retrieves the values of the collation information (step S57). The scanner application 1101 requests the application control unit 1103 to start the operation of the scanner engine 1107. After the scanner engine 1107 starts operating, the scanner application 1101 scans a document (step S58). The scanner application 1101 converts the collation information into the XML format (refer to FIG. 15).

The flow-execution control unit 1903 then merges the retrieved collation information into the flow-definition data 1906 (step S59).

The flow-execution control unit 1903 controls the processes to be executed with respect to the image data based on the flow-definition data 1906 in which the collation information is merged. That is, when intermediate processes are defined in the flow-definition data 1906, the flow-execution control unit 1903 instructs the processing unit 1910 to execute the intermediate processes (step S60). On the other hand, when delivery processes are defined in the flow-definition data 1906, the flow-execution control unit 1903 instructs the processing unit 1910 to execute the delivery processes (step S61). As described above, in the network delivery system according to the third embodiment, when the MFP 1900 starts scanning a document, a user is asked to enter from the collation-information entry sheet the collation information necessary to define one or more flows of processes to be executed with respect to image data of the scanned document. The flow-execution control unit 1903 merges the collation information into the flow-definition data 1906 and controls the execution of the processes based on the flow-definition data 1906. Because the collation information can be entered or edited, the user can have a better control on the execution of processes with respect to the image data.

The MFP 1900 can also be configured to include a validating unit, identical to the validating unit 1704 according to the second embodiment, such that the validating unit can check for consistency between image data of a scanned document and collation information entered by a user regarding the image data. When the validating unit finds inconsistency between the image data and the collation information, the MFP 1900 can be configured to redisplay the collation-information entry sheet on the screen 1111 such that the user can reenter appropriate collation information. Alternatively, the MFP 1900 can be configured such that the scanner application 1101 repeats the scanning process.

In the network delivery system according to the first two embodiments, the hardware configuration of the delivery server 200 and the delivery server 1700 is similar to a personal computer or a workstation. That is, the delivery server 200 and the delivery server 1700 include a controlling unit such as a central processing unit (CPU), a memory device such as a read only memory (ROM) or a random access memory (RAM), an external storage device such as a HDD or a compact disk drive (CD-drive) device, a display screen, and an input device such as a keyboard or a mouse.

The program to deliver the image data to various destinations executed in the network delivery system according to the first two embodiments (image-data-delivery controlling program) is provided in the form of an installable or executable file on a computer-readable storage device such as a compact disk read only memory (CD-ROM), a flexible disk (FD), a compact disk recordable (CD-R), or a digital versatile disk (DVD).

Alternatively, the image-data-delivery controlling program executed in the network delivery system according to the first two embodiments can be saved as a downloadable file on a computer connected to Internet or can be made available for distribution through a network such as Internet.

Moreover, the image-data-delivery controlling program executed in the network delivery system according to the first two embodiments can be installed in the ROM of the computer used for executing the program.

The image-data-delivery controlling program executed in the network delivery system according to the first embodiment contains modules for the first remote-communication unit 201, the processing unit 210, the flow-execution control unit 203, the flow-definition generating unit 204, and the entry-sheet-definition generating unit 205. Similarly, the image-data-delivery controlling program executed in the network delivery system according to the second embodiment contains modules for the first remote-communication unit 201, the processing unit 210, the flow-execution control unit 1703, the flow-definition generating unit 204, the entry-sheet-definition generating unit 205, and the validating unit 1704. In practice, the CPU of the server in the network delivery system according to each of the first two embodiments retrieves the corresponding image-data-delivery controlling program from the storage device and runs it such that the image-data-delivery controlling program is loaded in the corresponding main memory. As a result, the modules for the corresponding units are generated in the main memory. The image-data-delivery controlling program executed in the network delivery system according to the three embodiments is installed in the ROM of the computer used for executing the program.

The image-data-delivery controlling program executed in the network delivery system according to the three embodiments can be provided in the form of an installable or executable file on a computer-readable storage device such as a CD-ROM, a FD, a CD-R, or a DVD.

Alternatively, the image-data-delivery controlling program executed by in the network delivery system according to the three embodiments can be saved as a downloadable file on a computer connected to Internet or can be made available for distribution through a network such as Internet.

The image-data-delivery controlling program executed in the network delivery system according to the first embodiment contains modules for the first remote-communication unit 201, the processing unit 210, the flow-execution control unit 203, the flow-definition generating unit 204, and the entry-sheet-definition generating unit 205. The image-data-delivery controlling program executed in the network delivery system according to the second embodiment contains modules for the first remote-communication unit 201, the processing unit 210, the flow-execution control unit 1703, the flow-definition generating unit 204, the entry-sheet-definition generating unit 205, and the validating unit 1704. Similarly, the image-data-delivery controlling program executed in the network delivery system according to the third embodiment contains modules for the scanner application 1101, the printer application 1102, the application control unit 1103, the second remote-communication unit 1104, the display unit 1105, the retrieving unit 1106, the flow-execution control unit 1903, the flow-definition generating unit 1904, the entry-sheet-definition generating unit 1905, and the processing unit 1910. In practice, the CPU of the server in the network delivery system according to each of the three embodiments retrieves the corresponding image-data-delivery controlling program from the storage device and runs it such that the image-data-delivery controlling program is loaded in the corresponding main memory. As a result, the modules for the corresponding units are generated in the main memory.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device, comprising:
a first storage unit that stores therein flow-definition data for defining at least one flow that includes at least one process;
a second storage unit that stores therein screen-definition data defining information for displaying a screen to be displayed on a display, the screen-definition data defining information of an information-input-screen for inputting input-desired data of the at least one process;
a third storage unit that stores therein the flow-definition data corresponded to the screen-definition data;
a first receiving unit that receives flow data for executing the flow being selected via the display;
a checking unit that checks whether or not the flow-definition data of the flow that is to be executed based on the flow data received by the first receiving unit correspond to the screen-definition data;
a first display control unit for displaying the screen based on the screen-definition data, when the checking unit judges that the flow-definition data received by the first receiving unit correspond to the screen-definition data;
a second receiving unit that receives the information input based on the screen displayed by the first display control unit; and
an executing unit that sets the input data received by the second receiving unit and executes the at least one process based on the flow-definition data.

2. The information processing device according to claim 1, wherein:
the information processing device is configured to be connected to an image forming apparatus which includes the display;
the first receiving unit receives the flow data from the image forming apparatus; and
the display control unit sends the screen-definition data to the image forming apparatus and displays the screen based on the screen-definition data on the display of the image forming apparatus.

3. The information processing device according to claim 1, wherein: the information processing device is an image forming apparatus; the image forming apparatus includes the first display control unit therein; and the first display control unit displays the screen based on the screen-definition data on the display.

4. The information processing device according to claim 1, further comprising: a third receiving unit that receives an input of image data; and wherein the executing unit executes a process on the image data based on the flow-definition data.

5. The information processing device according to claim 1, further comprising: a maintaining unit that maintains the input data received by the second receiving unit; and wherein the first display control unit displays the information-input-screen, upon reselecting the input data maintained in the maintaining unit.

6. The information processing device according to claim 1, further comprising:
a validating unit that checks the input data received by the second receiving unit;
a second display control unit that displays an error message on the display based on checking by the validating unit; and wherein
the second storing unit stores the screen-definition data that further defines a checking condition for checking the input data,
the validating unit executes checking of the input data based on the checking condition, and
the second display control unit displays the error message, when the validating unit judges that the input data does not satisfy the checking condition.

7. An information processing method, comprising:
using a first storage unit to store therein flow-definition data for defining at least one flow that includes at least one process;
using a second storage unit to store therein screen-definition data defining information for displaying a screen to be displayed on a display, the screen-definition data defining information of an information-input-screen for inputting input-desired data of the at least one process;
using a third storage unit to store therein the flow-definition data corresponded to the screen-definition data;
using a first receiving unit to receive flow data for executing the flow being selected via the display;
using a checking unit to check whether or not the flow-definition data of the flow that is to be executed based on the flow data received by the first receiving unit correspond to the screen-definition data;
using a first display control unit to display the screen based on the screen-definition data, when the checking unit judges that the flow-definition data received by the first receiving unit correspond to the screen-definition data;
using a second receiving unit to receive the information input based on the screen displayed by the first display control unit; and
using an executing unit to set the input data received by the second receiving unit and to execute the at least one process based on the flow-definition data.

8. The method of claim 7, further comprising the step of: using a third receiving unit to receive an input of image data; and wherein the executing unit executes a process on the image data based on the flow-definition data.

9. The method of claim 7, further comprising the step of: using a maintaining unit to maintain the input data received by the second receiving unit; and wherein the display control unit displays the information-input-screen, upon reselecting the input data maintained in the maintaining unit.

10. The method of claim 7, further comprising the steps of: using a validating unit to check whether the input image data corresponds to the information of the image data input when at least one process on the input image data is executed; and using a requiring unit to require inputting image data by the third receiving unit or displaying the information-input-screen by the display control unit, when the validating unit finds consistency between the input image data and the information of the image data.

11. A process control system, comprising:
an information processing device, including:
a first storage unit that stores therein flow-definition data for defining at least one flow that includes at least one process;
a second storage unit that stores therein screen-definition data defining information for displaying a screen to be displayed on a display, the screen-definition data defining information of an information-input-screen for inputting input-desired data of the at least one process;
a third storage unit that stores therein the flow-definition data corresponded to the screen-definition data;
a first receiving unit that receives flow data for executing the flow being selected via the display;
a checking unit that checks whether or not the flow-definition data of the flow that is to be executed based on the flow data received by the first receiving unit correspond to the screen-definition data;

a first display control unit for displaying the screen based on the screen-definition data, when the checking unit judges that the flow-definition data received by the first receiving unit correspond to the screen-definition data;

a second receiving unit that receives the information input based on the screen displayed by the first display control unit; and an executing unit that sets the input data received by the second receiving unit and executes the at least one process based on the flow-definition data.

12. The system of claim 11, further comprising: a third receiving unit that receives an input of image data; and wherein the executing unit executes a process on the image data based on the flow-definition data.

13. The system of claim 11, further comprising: a maintaining unit that maintains the input data received by the second receiving unit; and wherein the display control unit displays the information-input-screen, upon reselecting the input data maintained in the maintaining unit.

14. The system of claim 11, further comprising: a validating unit that checks whether the input image data corresponds to the information of the image data input when at least one process on the input image data is executed; and a requiring unit that requires inputting image data by the third receiving unit or displaying the information-input-screen by the display control unit, when the validating unit finds consistency between the input image data and the information of the image data.

* * * * *